United States Patent [19]

Cook et al.

[11] Patent Number: 5,191,013
[45] Date of Patent: Mar. 2, 1993

[54] MACROCYCLIC FILLED COMPOSITIONS CONVERTIBLE TO POLYESTER COMPOSITES

[75] Inventors: Todd D. Cook; Andrew J. Salem, both of Schenectady; Thomas L. Evans, Clifton Park; Eric J. Pearce, Clifton Park; Kevin P. McAlea, Clifton Park, all of N.Y.

[73] Assignee: General Electric Company, Schenectady, N.Y.

[21] Appl. No.: 700,839

[22] Filed: May 16, 1991

[51] Int. Cl.$^5$ .......................... C08J 5/04; C08K 3/10; C08L 67/00
[52] U.S. Cl. .................................... 524/601; 528/272
[58] Field of Search ........................ 524/601; 528/272

[56] References Cited

U.S. PATENT DOCUMENTS

| | | | |
|---|---|---|---|
| 4,740,583 | 4/1988 | Brunelle et al. | 524/601 |
| 4,810,744 | 3/1989 | Light | 524/494 |
| 5,039,783 | 8/1991 | Brunelle et al. | 528/272 |

OTHER PUBLICATIONS

Evans et al., U.S. patent application Ser. No. 07/702,577, filed May 20, 1991.

*Primary Examiner*—Paul R. Michl
*Assistant Examiner*—U. K. Rajguru
*Attorney, Agent, or Firm*—William H. Pittman

[57] ABSTRACT

Thermoplastic polyester composites are prepared from compositions comprising a filler, at least one macrocyclic poly(alkylene dicarboxylate) oligomer and a polymerization catalyst therefor. The use of polyester oligomer mixtures is preferred, and they may be present in liquid or solid form. The polyester composites prepared therefrom are characterized by excellent properties including solvent resistance.

22 Claims, No Drawings

MACROCYCLIC FILLED COMPOSITIONS CONVERTIBLE TO POLYESTER COMPOSITES

This invention relates to the formation of thermoplastic composites. More particularly, it relates to compositions convertible to thermoplastic polyester composites.

Resinous composites containing thermoplastic resins in combination with fillers, most often of a fibrous nature, have become of increasing interest in recent years. Several problems have been encountered in the preparation of such composites. In the first place, most thermoplastic resins have relatively high melt viscosities which make fiber wetting difficult. In the second place, such resins can be melted only at relatively high temperatures, requiring substantial and expensive energy input for fabrication. Composite formation therefore typically requires providing an extremely short path that the resin must traverse to reach the fiber surface. This is typically achieved by grinding the resin into very fine powder which is intermingled with the fibers, or by employing solution impregnation followed by evaporation of the solvent.

Thermoset composites, on the other hand, are often much easier to prepare. The thermosetting materials are typically of much lower viscosity when liquid than are thermoplastic resins. Moreover, it is easy to demold a thermoset material after a molding operation, since melting does not occur at or above the curing temperature.

Methods and materials for forming thermoplastic composites which offer similar advantages to those encountered in thermoset composite systems are very desirable. A step in this direction was made by the development of the cyclic polycarbonate oligomer "prepregs" described in U.S. Pat. No. 4,740,583. Such prepregs, comprising cyclic polycarbonate oligomers in combination with filler materials, are easy to process because of the relatively low melt viscosity of the cyclic polycarbonate compositions. It is relatively easy to polymerize the cyclic polycarbonates to linear polycarbonates, forming thermoplastic composites with many valuable properties.

Nevertheless, polycarbonate composites prepared from cyclic polycarbonate oligomers have some disadvantages which warrant further investigation in the thermoplastic composite area. One such disadvantage is that the melt viscosities of the cyclic polycarbonate oligomers, while substantially lower than those of essentially all thermoplastic resins (e.g., about 5.7 poise at 250° C. for bisphenol A polycarbonate cyclics), are still too high for convenient employment in certain types of composite-forming operations. Another is that polycarbonate is inherently not a solvent-resistant material, with the result that the composites are easily degraded by organic solvents. Still another is the necessity for a large thermal cycle (typically 100°–150° C.), since the mold must be cooled to solidify the polycarbonate before the composite part is removed.

The present invention provides composite precursor compositions of extremely low melt viscosity, convertible by polymerization to polyester composites of high crystallinity and solvent resistance. Said compositions are capable of polymerization at temperatures between the melting point of the resin precursor and the crystalline melting temperature of the product polyester. Thus, it is possible to employ an essentially isothermal molding cycle for the preparation (e.g., by molding) of composite parts from such precursors.

In one of its aspects, therefore, the invention includes compositions comprising a filler; at least one macrocyclic polyester oligomer comprising structural units of the formula

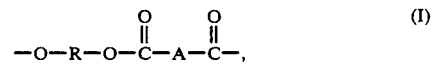

wherein R is an alkylene or mono- or polyoxyalkylene radical containing a straight chain of about 2–8 atoms and A is an m- or p-linked monocyclic aromatic or alicyclic radical; and a catalytically effective amount of a macrocyclic polyester oligomer polymerization catalyst.

Suitable fillers for the compositions of this invention include particulate materials such as clay, talc, quartz, wood flour, finely divided carbon and silica. Fillers comprising continuous or chopped fibers, including fibrous carbon, glass, boron and fibrous polymers such as poly(butylene terephthalate) and highly oriented polyamide, are particularly useful. Carbon and glass fibers are frequently preferred, with carbon fibers being advantageous when a particularly stiff composite article is desired. Continuous fillers may be in unidirectional form, either as yarns or as random fibers, or may be woven into fabric batts or tapes.

The macrocyclic polyester oligomers may be employed as single compounds or, preferably, as mixtures of oligomers of various degrees of polymerization. Such oligomer mixtures may be prepared by contacting at least one diol of the formula HO-R-OH and at least one diacid chloride of the formula

under substantially anhydrous conditions and in the presence of a substantially water-immiscible organic solvent, with at least one unhindered tertiary amine; said contact being conducted at a temperature from about −25° to about +25° C. This method of preparation is disclosed and claimed in copending, commonly owned application Ser. No. 07/608,767 now U.S. Pat. No. 5,039,783.

Useful diols include alkylene glycols and polyalkylene glycols, provided the straight chain connecting the hydroxy groups contains about 2–8 atoms. Suitable alkylene glycols include ethylene glycol, propylene glycol, tetramethylene glycol, hexamethylene glycol and neopentylene glycol. Suitable polyalkylene glycols include diethylene glycol and triethylene glycol. Ethylene glycol and tetramethylene glycol are preferred.

The other reagent used to form the macrocyclic polyester oligomers is a diacid chloride containing an A value which may be an m- or p-linked monocyclic aromatic or alicyclic radical. Included are m- and p-phenylene, substituted derivatives thereof, and similarly structured cyclohexylene and cyclopentylene radicals. The m- and p-phenylene radicals, and especially p-phenylene, are preferred.

Also employed is at least one unhindered tertiary amine and a substantially water-immiscible organic solvent. The essential feature of the amine is the lack of a substantial amount of steric hindrance around the basic nitrogen atom. Preferred amines of this type are polycyclic compounds with a tertiary nitrogen in the bridgehead position, as illustrated by quinuclidine and 1,4-diazabicyclo[2.2.2]octane (DABCO), which have the following formulas, respectively:

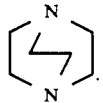

Also suitable, though less preferred because they produce the macrocyclic oligomers in lower yield, are N-methyl heterocyclic monoamines such as N-methylpyrrolidine and N-methylpiperidine, especially the former.

As organic solvents, various water-immiscible nonpolar organic liquids may be employed. Illustrative liquids of this type are aromatic hydrocarbons such as toluene and xylene; substituted aromatic hydrocarbons such as chlorobenzene, o-dichlorobenzene and nitrobenzene; and chlorinated aliphatic hydrocarbons such as chloroform, methylene chloride, trichloroethane and tetrachloroethane. Chlorinated aliphatic hydrocarbons are preferred, with methylene chloride frequently being most preferred because of its availability and particular suitability. It is frequently advantageous to employ, in combination with the water-immiscible solvent, a more polar combined oxygen-containing solvent such as tetrahydrofuran in which the diol is soluble to facilitate dissolution thereof.

The molar ratio of diol to diacid chloride is preferably about 1:1, although some variation (generally no more than about 5%) is permissible. Unlike the method for preparation of cyclic polyarylates described in the aforementioned U.S. Pat. No. 4,829,144, the present method requires that the amine be employed in amounts approximating those of the diol and diacid chloride combined, rather than in catalytic amounts. Formation of an acylammonium salt by reaction of the amine with the diacid chloride is apparently a step in the process. Typical molar ratios of amine to combination of diol and diacid chloride are in the range of about 1.0–1.5:1, with 1.25:1 frequently being preferred.

The proportion of solvent employed in the reaction is not critical. In general, highest yields are obtained at concentrations of diol and diacid chloride in the range of about 0.1–0.5M.

The precise order of addition of reagents is not critical, except that the amine and diacid chloride should be prevented from coming into contact with each other prior to contact with the diol. This is necessary because the acylammonium salt which is thus formed undergoes nearly immediate decomposition by nucleophilic displacement of nitrogen from a carbon atom by the chloride ion also present in said salt.

Thus, it is possible to introduce the diol, diacid chloride and amine simultaneously into the reaction vessel, with the amine being introduced either separately or in admixture with the diol. It is also possible to introduce the diol and diacid chloride into the reaction vessel which already contains the amine, in which case the diol and diacid chloride may be introduced separately or in admixture.

It is essential that the reaction conditions be substantially anhydrous. The presence of an appreciable amount of water will cause hydrolysis of the diacid chloride or the acylammonium salt, to produce carboxylic acid which may then undergo dehydration to an anhydride. Such hydrolysis will naturally decrease the yield of macrocyclic polyester oligomer.

It is also essential to conduct the reaction at a temperature from about $-25°$ to about $+25°$ C., preferably from about $-25°$ to about $5°$ C. and most preferably from about $-10°$ to $0°$ C. At temperatures below about $-25°$ C., the process becomes impractical by reason of an extremely low reaction rate. At temperatures above about $+25°$ C., side reactions predominate; they may include decomposition of the acylammonium salt and reaction of the amine with chlorinated aliphatic hydrocarbon used as solvent, to form quaternary ammonium salts. Yields are maximized at temperatures no higher than about $5°$ C.

When the solvent is a chlorinated aliphatic hydrocarbon or similar material containing highly nucleophilic substituents, reaction with the amine may be relatively rapid at temperatures above about $5°$ C. Under such conditions, it will generally be advisable to introduce the diol, diacid chloride and amine simultaneously as previously described, so as to ensure contact between the amine and diacid chloride before the former comes into possible reactive contact with the solvent.

Following the reaction between the diacid chloride and diol, it is generally necessary to remove linear polyester in the form of oligomers and high polymer. The high polymer portion of the linears is insoluble in the solvents employed, and may be removed by filtration. Linear oligomers are most conveniently removed by column chromatography through silica gel or the like. Following the removal of high polymer and linear oligomers, the solvent may be removed and the macrocyclic oligomers recovered in substantially pure form.

The compositions prepared by the above-described method are mixtures of macrocyclic polyester oligomers, usually having degrees of polymerization from 2 to about 12. They usually comprise predominantly dimer, trimer, tetramer and pentamer.

Structural identification of the macrocyclic polyester oligomers was made by comparison with authenic samples isolated from commercially availabe linear polyesters. Thus, extraction of a commercial sample of poly(butylene terephthalate) with hot dioxane yielded about 1% by weight of a pale yellow semi-solid, from which linear oligomers were removed by flash chromatography over silica gel. Medium pressure liquid chromatography was then employed to isolate the macrocyclic dimer, trimer, tetramer, pentamer and hexamer from the remaining mixture.

The preparation of macrocyclic polyester oligomers is illustrated by the following examples. All percentages are by weight.

EXAMPLES 1–10

A three-necked round-bottomed flask fitted with a mechanical stirrer, nitrogen purge and septum for reagent addition was charged with 100 ml. of methylene chloride and 5.6 grams (50 mmol.) of an amine as specified hereinafter. The mixture was cooled to $0°$ C. and there were separately added in a nitrogen atmosphere over 30 minutes, with stirring, solutions of 20 mmol. of various diols in tetrahydrofuran and solutions of 20 mmol. of isophthaloyl or terephthaloyl chloride in 10 ml. of methylene chloride. Stirring was continued for 5 minutes after addition was completed, and then 2 ml. of methanol was added to quench the reaction. Stirring was resumed for 5 minutes, after which 50 ml. of 1M aqueous hydrochloric acid solution was added, following by another 5 minutes of stirring. The organic and aqueous layers were separated and the aqueous layer was extracted with an additional 50 ml. of methylene chloride. The combined organic solutions were filtered using a filter aid material when necessary, washed with dilute aqueous hydrochloric acid solution and aqueous sodium chloride solution, and evaporated to dryness. The products were purified by flash chromatography over silica gel, using 1-2% acetone solutions in methylene chloride as the eluant, followed by evaporation of the solvent.

The products were the desired macrocyclic polyester oligomer compositions. Molecular structures were proved by infrared and proton nuclear magnetic resonance spectroscopy and comparison with known macrocyclic oligomers.

The macrocyclic poly(butylene isophthalate) oligomer compositions began to melt at 110° C., flowed freely at 185° C. and were completely molten at 200° C. The corresponding poly(butylene terephthalate) compositions began to melt at 140° C. and became a freely flowing liquid at 190° C.

Further details are given in Tables I and II. In Table II, the amine employed in each example was DABCO. "HPLC yield" is the crude yield determined by high pressure liquid chromatography, without calibration; the lack of calibration is in part responsible for the fact that HPLC yield is sometimes lower than "isolated yield". The latter is the yield of pure cyclics obtained after column chromatography. The designation "M" for tetrahydrofuran in Table I indicates that the minimum amount required for dissolution of the diol was employed.

TABLE I

| | Example | | | | | |
|---|---|---|---|---|---|---|
| | 1 | 2 | 3 | 4 | 5 | 6 |
| Diacid chloride: | | | | | | |
| Isophthaloyl | X | — | X | X | X | — |
| Terephthaloyl | — | X | — | — | — | X |
| Diol: | | | | | | |
| Ethylene glycol | X | X | — | — | — | — |
| Tetramethylene glycol | — | — | X | X | — | — |
| Hexamethylene glycol | — | — | — | — | X | X |
| Amine: | | | | | | |
| Quinuclidine | — | — | X | — | — | — |
| DABCO | X | X | — | X | X | X |
| Tetrahydrofuran, ml. | 10 | 10 | M | M | 10 | 10 |
| HPLC yield, % | 112 | 82 | 64 | 70 | 110 | 102 |
| Isolated yield, % | — | — | 50 | 63 | 55 | — |

TABLE II

| | Example | | | |
|---|---|---|---|---|
| | 7 | 8 | 9 | 10 |
| Diacid chloride: | | | | |
| Isophthaloyl | X | — | X | — |
| Terephthaloyl | — | X | — | X |
| Diol: | | | | |
| Neopentylene glycol | X | X | — | — |
| Diethylene glycol | — | — | X | X |
| HPLC yield, % | 89 | 101 | 117 | 84 |
| Isolated yield, % | 54 | — | 53 | 49 |

EXAMPLES 11-15

The procedure of Examples 1-10 was repeated using tetramethylene glycol as the diol, with the exception that a single solution in tetrahydrofuran of diol and diacid chloride was introduced. The results are given in Table III.

TABLE III

| | Example | | | | |
|---|---|---|---|---|---|
| | 11 | 12 | 13 | 14 | 15 |
| Diacid chloride: | | | | | |
| Isophthaloyl | X | X | X | — | — |
| Terephthaloyl | — | — | — | X | X |
| Amine: | | | | | |
| Quinuclidine | — | X | — | X | — |
| DABCO | X | — | — | — | X |
| N-Methylpyrrolidine | — | — | X | — | — |
| HPLC yield, % | 30 | 30 | 20 | — | 48 |

EXAMPLES 16-18

The procedure of Examples 1-10 was repeated employing tetramethylene glycol as the diol and quinuclidine as the amine, except that the diol and amine were both dissolved in tetrahydrofuran and the solution thus obtained was introduced simultaneously with a solution of the diacid chloride in methylene chloride to the reaction vessel containing only methylene chloride. The results are given in Table IV.

TABLE IV

| | Example | | |
|---|---|---|---|
| | 16 | 17 | 18 |
| Diacid chloride: | | | |
| Isophthaloyl | — | X | — |
| Terephthaloyl | X | — | X |
| HPLC yield, % | 65 | 65 | 57 |
| Isolated yield, % | — | 32 | 17 |

EXAMPLES 19-21

The procedure of Examples 16-18 was repeated, except that the amount of tetrahydrofuran employed was the minimum amount needed to dissolve the diol and amine. The results are given in Table V.

TABLE V

| | Example | | |
|---|---|---|---|
| | 19 | 20 | 21 |
| Amine: | | | |
| N-Methylpyrrolidine | X | — | — |
| DABCO | — | — | X |
| Quinuclidine | — | X | — |
| HPLC yield, % | 63 | 73 | 70 |
| Isolated yield, % | 58 | 60 | 66 |

EXAMPLES 22-25

The procedure of Examples 1-10 was repeated employing tetramethylene glycol as the diol and DABCO as the amine, except that 20 ml. of methylene chloride was employed to dissolve the diacid chloride. In Example 24, 1% excess tetramethylene glycol was employed. The results are given in Table VI.

TABLE VI

| | Example | | | |
|---|---|---|---|---|
| | 22 | 23 | 24 | 25 |
| Diacid chloride: | | | | |
| Isophthaloyl | — | X | X | — |
| Terephthaloyl | X | — | — | X |
| HPLC yield, % | 47 | 67 | 53 | 56 |
| Isolated yield, % | 66 | 82 | 72 | 75 |

Macrocyclic polyester oligomer polymerization catalysts useful in the compositions of this invention include basic reagents, tin alkoxides, organotin compounds (i.e., compounds containing a Sn—C bond), titanate esters and metal acetylacetonates.

Suitable basic reagents include alkali metal salicylates, alkali metal alkoxides and phosphines. Illustrative salicylates are lithium salicylate, sodium salicylate and potassium salicylate, with lithium salicylate generally being preferred. Illustrative alkoxides are the sodium and potassium $C_{1-4}$ alkoxides. Illustrative phosphines include triphenylphosphine and substituted triphenylphosphines, particularly those containing electron-donating substituents such as tris(p-methoxyphenyl)-phosphine.

Illustrative tin alkoxides are those containing $C_{1-4}$ alkyl groups; they include stannous methoxide, ethoxide and propoxides. Illustrative organotin compounds are dialkyltin(IV) oxides such as di-n-butyltin(IV) oxide and di-n-octyltin(IV) oxide, as well as di-alkyltin(IV) dialkoxides such as di-n-butyltin(IV) di-n-butoxide and heterocyclic analogs thereof such as 2,2-di-n-butyl-2-stanna-1,3-dioxacycloheptane. Illustrative titanate esters are isopropyl titanate and 2-ethylhexyl titanate.

The metal acetylacetonates are illustrated by ferric acetylacetonate and cobalt(III) acetylacetonate. They are often advantageously employed in two-component catalyst systems in combination with an aliphatic alcohol, especially a diol such as 1,12-dodecanediol. The metal acetylacetonate and alcohol are generally employed in approximately equimolar proportions. Such two-component catalyst systems may be advantageous in situations where close control of the time of polymerization is necessary, as in resin transfer molding where two liquid streams, each containing one of the catalyst components, may be fed into the mold. Under such conditions, polymerization cannot take place until the time of contact of the two streams within the mold.

The proportions of filler and macrocyclic oligomers in the compositions of this invention are subject to wide variation. In general, said compositions will contain about 20-80% macrocyclic oligomer composition by weight, with the remainder being filler. Also contemplated are preforms having much lower proportions of oligomers, typically as low as 5%. The proportion of catalyst is typically about 0.01-2.0 and preferably about 0.05-1.0 mole percent based on structural units in the oligomers.

Considerable variation is also possible in the form in which the macrocyclic oligomers are combined with the filler. It is, of course, contemplated to form a "prepreg" (i.e., a filler-impregnated composition capable of being handled and of conversion to a resinous composite) by impregnating the filler with liquid macrocyclic oligomers and solidifying the latter, forming a consolidated layer which may be stacked with other similar layers to form a moldable article. Also contemplated is the combination of filler with unconsolidated solid macrocyclic oligomers, typically in finely powdered form; articles thus produced are similar or identical to preforms of the type known to those skilled in the art.

A blending option of particular value with the compositions of this invention is the combination of filler with liquid macrocyclic oligomer, typically in a mold. This is possible because f the extremely low melt viscosities of the macrocyclic oligomer compositions, about 0.07 poise at 250° C. for a typical poly(butylene terephthalate) macrocyclic oligomer mixture. Because of this low melt viscosity, it is frequently unnecessary to impregnate the fibers prior to placing them in the mold.

The compositions of this invention may be converted to thermoplastic poly(alkylene dicarboxylate) composites by heating to polymerize the macrocyclic polyester oligomers. Polymerization temperatures are typically in the range of about 165°-300° C.

It is frequently preferred for polymerization to take place above the temperature at which the oligomers are completely melted but below the melting temperature of the crystalline linear polyester obtained as product. In the case of macrocyclic poly(butylene terephthalate) oligomers, that is in the range of about 160°-220° C. The polymerization product then crystallizes spontaneously upon formation and has sufficient mechanical integrity to be easily removed from the mold, permitting an essentially isothermal polymerization process without the necessity of a cooling step before demolding.

It is generally found that the rate of crystallization of poly(butylene terephthalate) reaches a maximum in the neighborhood of 170° C. Under certain circumstances, said crystallization may inhibit further polymerization of the macrocyclic polyester oligomers. Therefore, in an especially preferred embodiment of the invention the polymerization of macrocyclic poly(butylene terephthalate) oligomers is conducted at temperatures within the range of about 175°-220° C. to ensure rapid polymerization followed by relatively slower crystallization.

As will be apparent from the description hereinabove, the compositions of this invention may be employed in a wide variety of ways to make molded thermoplastic composite articles. Suitable methods of composite formation combined with molding or other types of shaping include resin transfer molding, pultrusion, injection molding, autoclave molding and compression molding.

Because of the relatively low viscosities of the macrocyclic polyester oligomers at molding temperatures, it may be preferable to employ a matched die type of mold. The surfaces of the mold may be coated with a suitable mold release agent, typically a silicone material, before charging with the oligomer composition. Upon polymerization, the compositions of this invention are converted to fiber-reinforced polyester articles which have the excellent properties characteristic of poly(alkylene dicarboxylates), including solvent resistance.

The preparation and polymerization of the compositions of this invention is illustrated by the following example.

EXAMPLE 26

A mixture of macrocyclic poly(butylene terephthalate) oligomers was dissolved in a hot toluene-methylene chloride mixture and 1 mole percent, based on structural units in the oligomers, of 2,2-di-n-butyl-2-stanna- 1,3-dioxacycloheptane was added. The solvent was removed in vacuum, leaving a solid mixture of oligomers and catalyst.

A 1.2-gram portion of said mixture was spread on the bottom of a 1.27×12.7-cm. matched die tool. The tool was then charged with 13 layers of 8-harness satin weave E-glass fabric coated with an epoxy-functionalized silane sizing. Each layer of glass fabric was covered with 500 mg. of the cyclics-catalyst mixture, except for the top layer which was covered with 1.2 grams. The resulting assemblage was dried in the mold under vacuum at 120° C. for 24 hours.

The mold was placed in a press preheated at 197° C. and was allowed to heat under a pressure of 7.0 kg./cm.$^2$ until a temperature of 190° C. was obtained (approximately two minutes). The mold was removed from the press and immediately opened without cooling, and the molded composite article was removed. The molecular weight of the poly(butylene terephthalate) in the composite was 85,000, as determined by gel permeation chromatography relative to polystyrene. It had a flexural strength of 434.4 MPa. and a flexural modulus of 275.8 GPa. The flexural strain to failure was 2.6, the same as that of the glass fibers.

What is claimed is:

1. A composition comprising a filler; at least one macrocyclic polyester oligomer comprising structural units of the formula

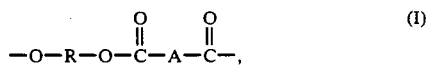

wherein R is an alkylene or mono- or polyoxyalkylene radical containing a straight chain of about 2–8 atoms and A is an m- or p-linked monocyclic aromatic or alicyclic radical; and a catalytically effective amount of a macrocyclic polyester oligomer polymerization catalyst.

2. A composition according to claim 1 wherein a mixture of polyester oligomers is employed.

3. A composition according to claim 2 wherein the catalyst is a basic reagent, tin alkoxide, organotin compound, titanate ester or metal acetylacetonate.

4. A composition according to claim 3 wherein the catalyst is present in the amount of about 0.01–2.0 mole percent based on structural units in the oligomers.

5. A composition according to claim 4 wherein R is ethylene or tetramethylene and A is m- or p-phenylene.

6. A composition according to claim 5 wherein the catalyst is an alkali metal salicylate, alkali metal alkoxide or phosphine.

7. A composition according to claim 5 wherein the catalyst is a stannous alkoxide containing $C_{1-4}$ alkyl groups.

8. A composition according to claim 5 wherein the catalyst is a dialkyltin(IV) oxide, a dialkyltin(IV) dialkoxide or a heterocyclic analog thereof.

9. A composition according to claim 8 wherein the catalyst is 2,2-di-n-butyl-2-stanna-1,3-dioxacycloheptane.

10. A composition according to claim 5 wherein the catalyst is a titanate ester.

11. A composition according to claim 5 wherein the catalyst is a metal acetylacetonate or a combination thereof with an aliphatic alcohol.

12. A composition according to claim 11 wherein the catalyst is an equimolar mixture of ferric acetylacetonate and 1,12-dodecanediol.

13. A composition according to claim 5 wherein the filler comprises continuous or chopped fibers.

14. A composition according to claim 13 wherein the proportion of filler is in the range of about 5–80% by weight.

15. A composition according to claim 5 wherein A is p-phenylene.

16. A composition according to claim 15 wherein R is tetramethylene.

17. A composition according to claim 16 wherein the catalyst is employed in the amount of about 0.05–1.0 mole percent based on structural units in the oligomers.

18. A composition according to claim 17 wherein A is p-phenylene.

19. A composition according to claim 18 wherein R is tetramethylene.

20. A composition according to claim 5 wherein the oligomers are in liquid form.

21. A composition according to claim 5 wherein the oligomers are in solid unconsolidated form.

22. A composition according to claim 5 wherein the oligomers are in solid consolidated form.

* * * * *